United States Patent [19]

Kurosawa et al.

[11] Patent Number: 5,542,518
[45] Date of Patent: Aug. 6, 1996

[54] METHOD OF IDENTIFYING THE DENOMINATIONS OF PIECES OF PAPER

[75] Inventors: Kazuo Kurosawa; Kazuto Matsuo; Akira Minoguchi, all of Kouza-gun, Japan

[73] Assignee: Toyo Communication Equipment Co., Ltd., Kangawa, Japan

[21] Appl. No.: 449,765

[22] Filed: May 24, 1995

(Under 37 CFR 1.47)

[30] Foreign Application Priority Data

May 25, 1994 [JP] Japan .................................. 6-134930

[51] Int. Cl.$^6$ .............................. G06K 9/00; G07D 7/00
[52] U.S. Cl. .............................. 194/206; 382/135; 356/71
[58] Field of Search .................................. 194/205, 206, 194/207, 317, 318; 382/135, 136; 356/71, 394

[56] References Cited

U.S. PATENT DOCUMENTS

| | | | |
|---|---|---|---|
| 3,564,268 | 2/1971 | Bayne et al. | 194/207 X |
| 4,041,456 | 8/1977 | Ott et al. | 382/135 |
| 4,464,787 | 8/1984 | Fish et al. | 382/135 |
| 4,487,306 | 12/1984 | Noa et al. | 194/207 |
| 5,437,357 | 8/1995 | Ota et al. | 194/207 X |

FOREIGN PATENT DOCUMENTS

| | | | |
|---|---|---|---|
| 0342647 | 11/1989 | European Pat. Off. | 194/207 |
| 0367921 | 5/1990 | European Pat. Off. | 194/317 |
| 0480736 | 4/1992 | European Pat. Off. | 194/317 |
| 2646025 | 4/1978 | Germany | 194/317 |
| 9106074 | 5/1991 | WIPO | 194/317 |

Primary Examiner—Karen B. Merritt
Assistant Examiner—Scott L. Lowe
Attorney, Agent, or Firm—Koda and Androlia

[57] ABSTRACT

A method of identifying the denominations of pieces of paper, for example, bills or securities. The method defines a separating hyperplane for each of all combinations of two denominations taken from the N denominations which divides the space so that the distribution ranges of the image data of the two denominations are completely separated into the different regions and storing the data defining the separating hyperplanes as template data in a memory; selects two denominations from the N denominations and retrieves the template data corresponding to the combination of denominations from the memory when the image data of a piece of paper of an unknown denomination is read in with a sensor for reading patterns; determines which one of the regions divided by the separating hyperplane the image data of the piece of paper is in; discards the denomination in the region in which the image data of the piece of paper is not present; repeats the same procedures by selecting two denominations from the remaining candidate denominations to reduce the number of the candidate denominations until only one denomination is left; and determines that the denomination remaining as the last is the denomination of the piece of paper.

1 Claim, 5 Drawing Sheets

METHOD OF IDENTIFYING THE DENOMINATIONS OF PIECES OF PAPER

BACKGROUND OF THE INVENTION

1. Field of the Invention

This invention relates to a method of identifying the denominations of pieces of paper, particularly to a method of identifying the denominations of bills inserted into machines such as automatic vending machines and automatic money exchanging machines.

2. Prior Art

Machines such as automatic vending machines and automatic money changing machines for dispensing merchandise or coins are provided with a device for identifying a denomination of an inserted bill.

In such machines, as shown in FIG. 5, a bill 1 is transferred by a conveying means such as a belt, the image data of the print pattern of the bill 1 is read by a photo sensor 2 disposed at predetermined positions with respect to the conveying means as the bill 1 advances a predetermined distance, and the image data is compared with the data of the print patterns stored in memory 3 to determine the denomination of the bill 1.

The photo sensor 2 comprises a light emitting part 4 and a light receiving part 5. The light emitting part 4 emits a constant quantity of visible light using an LED as the light source. The light emitted from the light emitting part 4 is irradiated onto the bill 1 and passes through it. Since the quantity of transmitting light varies according to the color and the density of the print pattern of the bill 1, the print pattern is detected by receiving the transmitted light and converting it into an electrical signal corresponding to the quantity of light with the light receiving part 5.

The image data of all denominations of bills, which is utilized to identify the bills, is stored in memory 3, and the image data of each bill is looked up and compared with the image data detected with the photo sensor 3 by a pattern matching technique. Since a bill may be conveyed to the photo sensor 2 forward or backward with its right or reverse side, generally four sets of image data are stored in the memory 3 for each denomination of bills. If a machine can accept six denominations of bills, pattern matching is performed 24 times when a bill is inserted.

To make it easier to understand, the conventional identifying method is described below in more detail, taking for example a case in which only one set of image data is stored in memory for each denomination of bill (on the assumption that bills are always conveyed in their predetermined one orientation) and six denominations of bills are identified.

FIG. 6 illustrates the concept of the conventional method identifying one of six denominations of bills. In FIG. 6, six ellipses A to F indicate the distribution of the image data obtained by reading six kinds of denomination of bills with the photo sensor, respectively. The mean point of each distribution is shown by a black point.

The distributions include errors caused by variation in reading a bill, in transferring a bill, and by creases and wrinkles of a bill. A space shown in FIG. 6 is an n-dimensional Euclidean space for representing a set of the values of n inputs of data used for identification as a point in it, but it is shown as a 2-dimensional plane for convenience in this specification.

Now suppose that the image data of an unknown bill read by the photo sensor is represented by point X in FIG. 6. Then the distances between point X and the mean point of the distribution of the image data of each denomination (degree of similarity) are compared with each other, and the denomination of the mean point of which is at the smallest distance (highest similarity), D in FIG. 6, is determined to be the denomination of the bill.

Actually, this verification of similarity is performed by calculating inner products of the normalized vector of the mean points and the normalized vector of point X, and then comparing the values of the inner products. This method is generally called "simple similarity comparison" and widely used. There is another method called "combined similarity comparison" that further uses the characteristic vector for each denomination for the calculation of the similarity.

However, there is a problem with the methods described above because their capability is not sufficient to identify bills when their outside dimensions are the same and the difference in the design of denominations is very small, such as US dollar bills.

For such bills, the distributions of the image data of all denominations are in close vicinity to each other as shown in FIG. 7, and image data X read by the photo sensor can be slightly nearer to the mean point of the distribution of denomination F than to that of denomination D though image data X is within the distribution range of denomination D, causing an incorrect determination that the similarity to denomination F is highest.

For this reason, the inserted bill must be returned to the customer as not identifiable when the difference between the similarity to a certain denomination and that to any other denomination are not sufficiently large.

This invention is made to solve the above problem, and the object of this invention is to provide a method of identifying the denominations of pieces of paper that has an improved identifying capability making it possible to correctly identify many denominations of bills, securities and the like with similar print patterns at an increased speed.

SUMMARY OF THE INVENTION

According to the present invention, the method of identifying the denominations of pieces of paper comprises obtaining the distribution of the image data for each of N denominations to identify; defining a separating hyperplane for each of all combinations of two denominations taken from the N denominations which divides the space so that the distribution ranges of the image data of the two denominations are completely separated into the different regions and storing the data defining the separating hyperplanes as template data in memory means; selecting two denominations from the N denominations and retrieving the template data corresponding to the combination of denominations from said memory means when the image data of a piece of paper of an unknown denomination is read by means for reading patterns; determining which one of the regions divided by said separating hyperplane said image data of said piece of paper is in; discarding the denomination in the region in which said image data of the piece of paper is not present; repeating the same procedures by selecting two denominations from the remaining candidate denominations to reduce the number of the candidate denominations until only one denomination is left; and determining that the denomination remaining to the last is the denomination of said piece of paper.

DETAILED DESCRIPTIONS OF PREFERRED EMBODIMENTS

This invention is described below in detail with reference to the drawings illustrating embodiments of the present invention.

Figure 7:
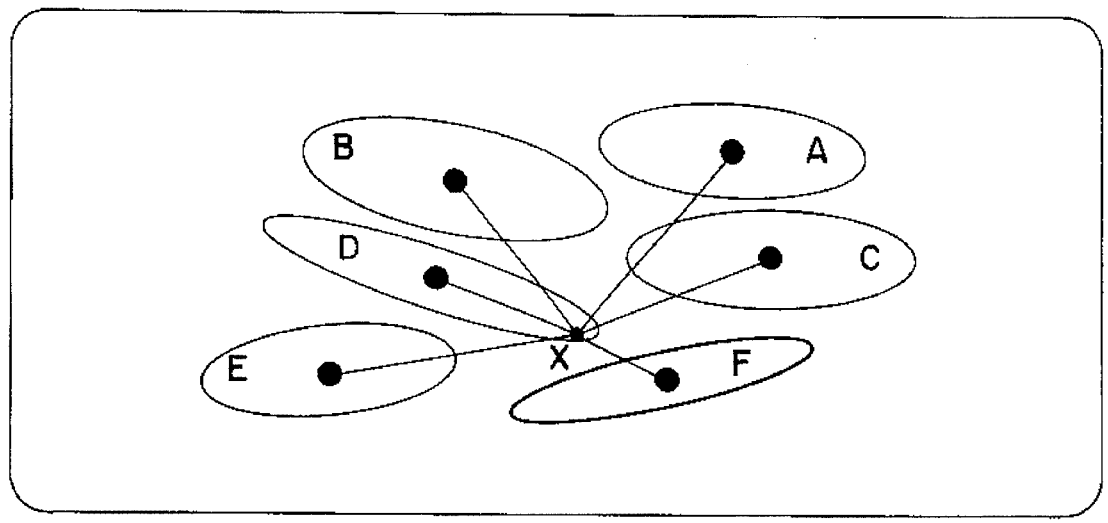
FIG. 7 shows the problem with the conventional methods for identifying the denominations of bills.

FIGS. 1 (a) to (e) are conceptual illustrations of the principle of the method of identifying the denominations of pieces of paper provided by the present invention, taking for example the case in which six denominations of bills A to F as in FIG. 7 are identified. In these Figures, point X indicates the image data of bill D read by the photo sensor.

First, as shown in FIG. 1 (a), the distributions of the image data of bills A and B are selected from six denominations of bills; and it is determined which region image data X falls in with respect to separating hyperplane P1 dividing the space so that the distributions of the image data of bills A and B are separated in different regions. Since image data X is in the same region as the image data of bill B, bill A is discarded. The separating hyperplane is represented with the distance from the origin of the coordinates defining the Euclidean space and the normal vector.

Next, as shown in FIG. 1 (b), the distributions of the image data of bills B and C are selected from the five denominations of bills with bill A excluded, the same operation is performed with respect to separating hyperplane P2, and consequently bill C is discarded.

By repetition of the same procedures using separating hyperplanes P1 to P5 defined beforehand, the distributions of the image data of bills B and D are selected and bill B is discarded in FIG. 1 (c); the distributions of the image data of bills D and E are selected and bill E is discarded in FIG. 1 (d); and the distributions of the image data of bills D and F are selected and bill F is discarded in FIG. 1 (e).

At this stage, there is no other denomination of bill left and hence bill D remaining to the last is determined to be the denomination of image data X.

The process of thus reducing the number of candidate denominations by repeatedly selecting two from the candidate denominations and then selecting the one more similar to the image data X to be identified from the two denominations is called "successive reduction" in this specification.

By the successive reduction, identification can be accomplished by five steps when the number of the denominations of bills to identify are six. For example, if the number of the denominations of bills to identify is N, the number of steps required is N−1; and hence this method can shorten the identification process, compared with the simple similarity comparison that requires N steps and the combined similarity comparison that requires αN steps.

Further, since the successive reduction method defines a separating hyperplane for each of N(N−1)/2 combinations of two image data distributions taken from N image data distributions of denominations in such a manner that the two image data distributions of each combination can be distinctly separated and makes an alternative selection between the two image data distributions taken from remaining image data distributions, an ambiguous decision can be avoided and the identifying capability improves remarkably compared to the conventional methods.

Figure 1A:
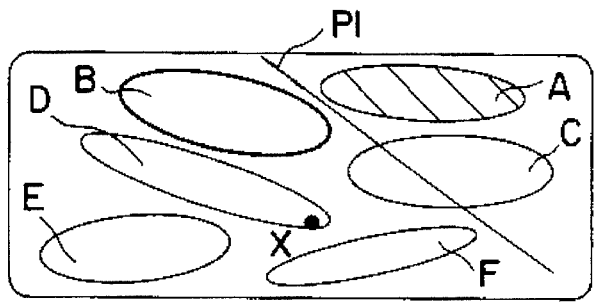
FIGS. 1 (a) to (e) are conceptual illustrations of the principle of the method of identifying the denominations of pieces of paper by the present invention.
Figure 1B:
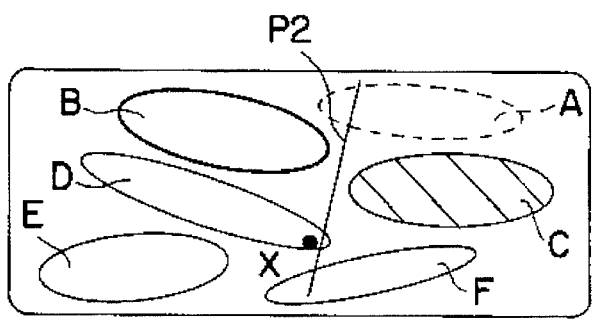
Figure 1C:
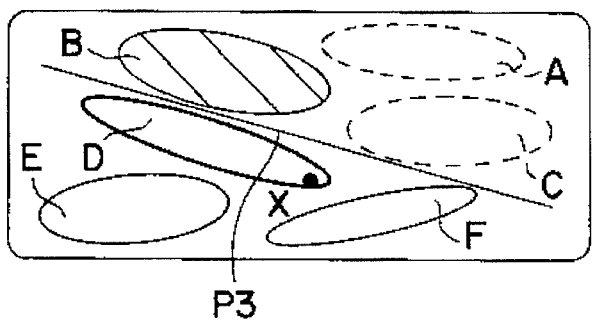
Figure 1D:
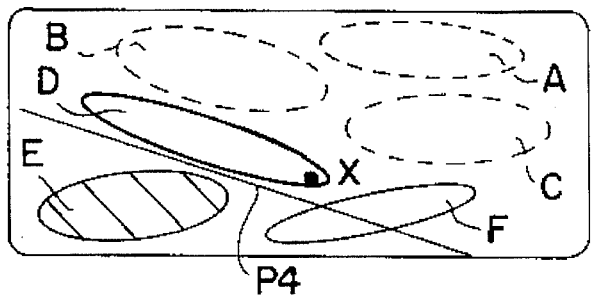
Figure 1E:
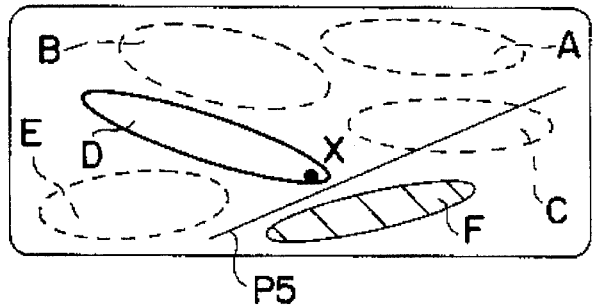
Figure 2:
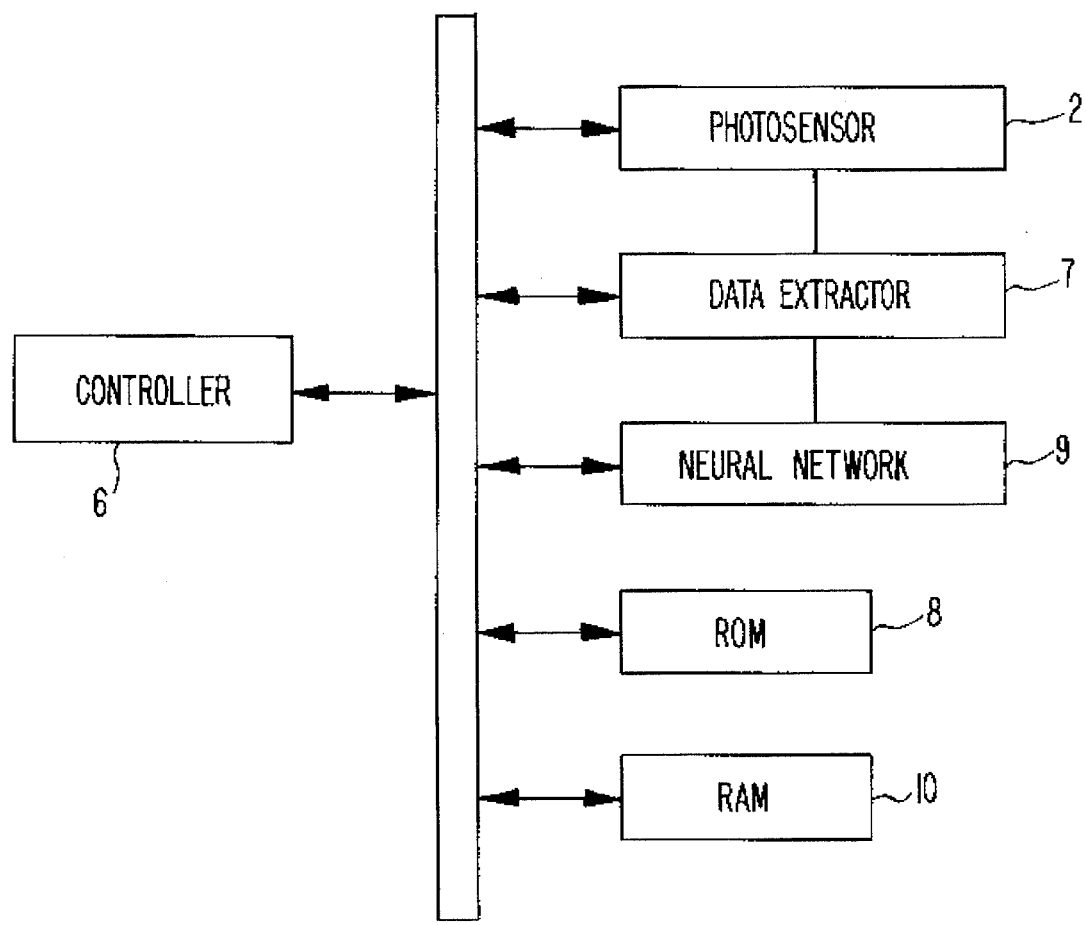
FIG. 2 is a block diagram of an embodiment of a bill identifying device using the method for identifying the denominations of pieces of paper by this invention.

FIG. 2 is a block diagram of an embodiment of the bill identifying device using the method for identifying the denominations of pieces of paper by the present invention.

When an unknown bill is inserted into the device and the image data is read by the photo sensor 2, the controller 6 randomly selects the image data of two denominations from the image data of N denominations of bills that the device can identify.

The image data read by the photo sensor 2 is processed in the data extractor 7 to omit the part of the image data corresponding to the print patterns of the two denominations similar to each other.

On the other hand, the controller 6 reads the data defining the separating hyperplane that separates the selected two denominations of bills from ROM 8 and transfers the data to a neural network 9. The neural network 9 analyses the relationship between the image data from the data extractor 7 and the separating hyperplane.

The controller 6 then determines which one of the two denominations to discard according to the result of the analysis by the neural network 9 and writes the denomination to be discard in the RAM 10.

Next, the controller 6 selects two denominations from the remaining candidate denominations with the one stored in the RAM 10 excluded by referring to the RAM 10 and performs the same process as mentioned the above. The number of candidate denominations are reduced by repetition of this process.

By this construction, the successive reduction is accomplished. In this embodiment, the identifying ability can be further improved by omitting the image data by the data extractor 7 in such a manner that the difference between the two selected denominations becomes distinct. The conditions of data extraction by the data extractor 7 can be determined for each of all combinations of two denominations and stored in the ROM 8 beforehand as the separating hyperplanes.

Figure 3A:
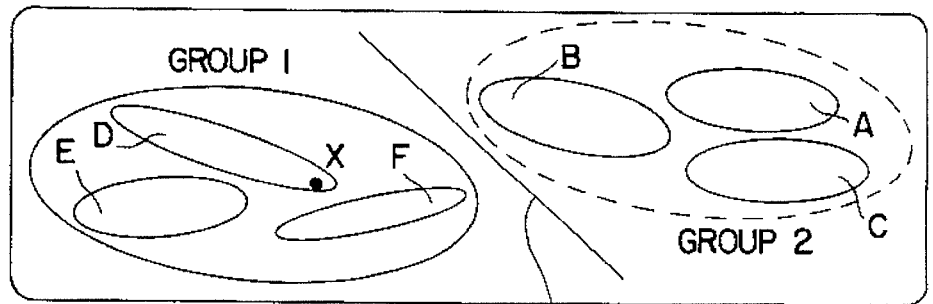
FIGS. 3 (a) to (c) are illustrations of a modified embodiment.
Figure 3B:
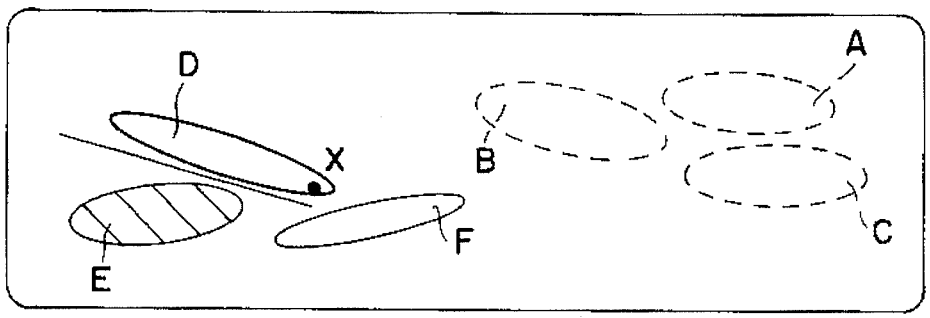
Figure 3C:
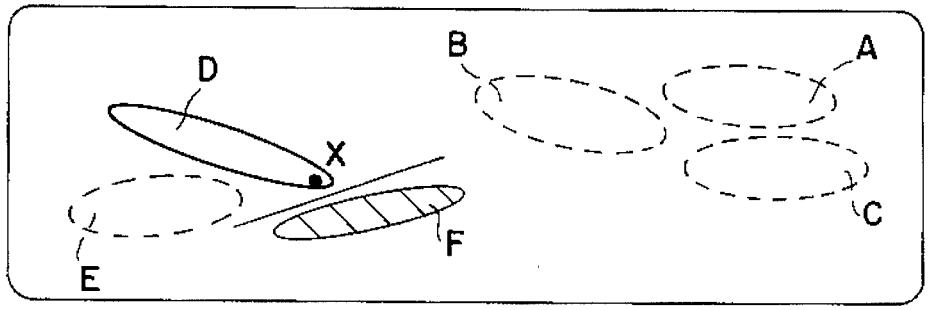

FIG. 3 is an illustration of an another embodiment of the present invention. In this embodiment, denominations are divided into groups such as group 1, group 2 and so on by appropriate conditions, for example, the relative similarity of the image data, and hyperplanes are defined so as to separate these groups, as shown in FIG. 3 (a). When the image data X of a bill of an unknown denomination is read in by the photo sensor, it is first determined which group X belongs to with respect to the hyperplanes by the successive reduction. Then, the denomination of the bill is identified by successive reduction using the denominations in the group as the candidates, as shown FIGS. 3 (b) and (c). By this method, the identifying process can be simplified and shortened. Although denominations are divided into two groups in this embodiment, they may be divided into more than two groups. This method is especially useful when handling bills of many countries.

If the image data of an unknown bill read by the photo sensor does not fall within any one of the distribution ranges of image data of the denominations (because of soil or lost parts), the final decision is made by using the conventional simple similarity test or combined similarity test for comparison of the image data of the unknown bill with that of the denomination remaining to the last.

Figure 4:
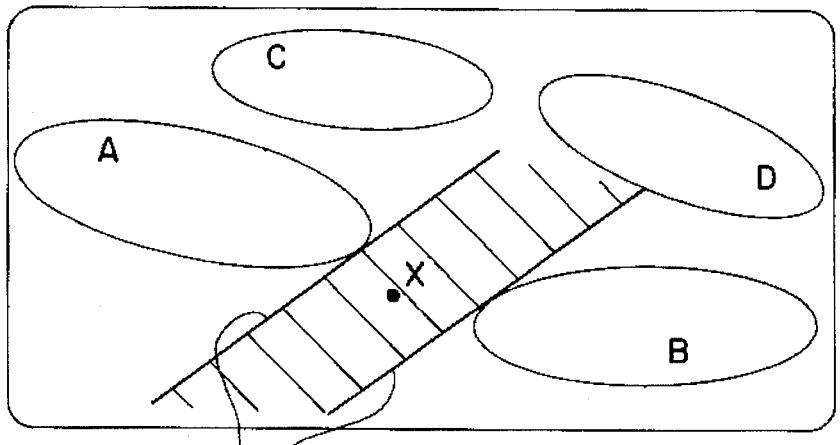
FIG. 4 is an illustration of another modified embodiment.
Figure 5:
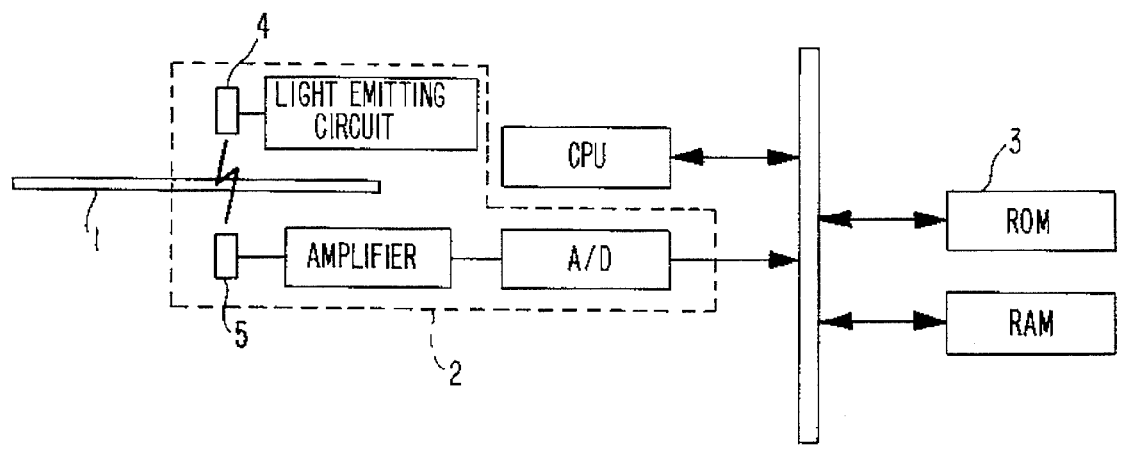
FIG. 5 shows the construction of a conventional device for identifying the denominations of bills.
Figure 6:
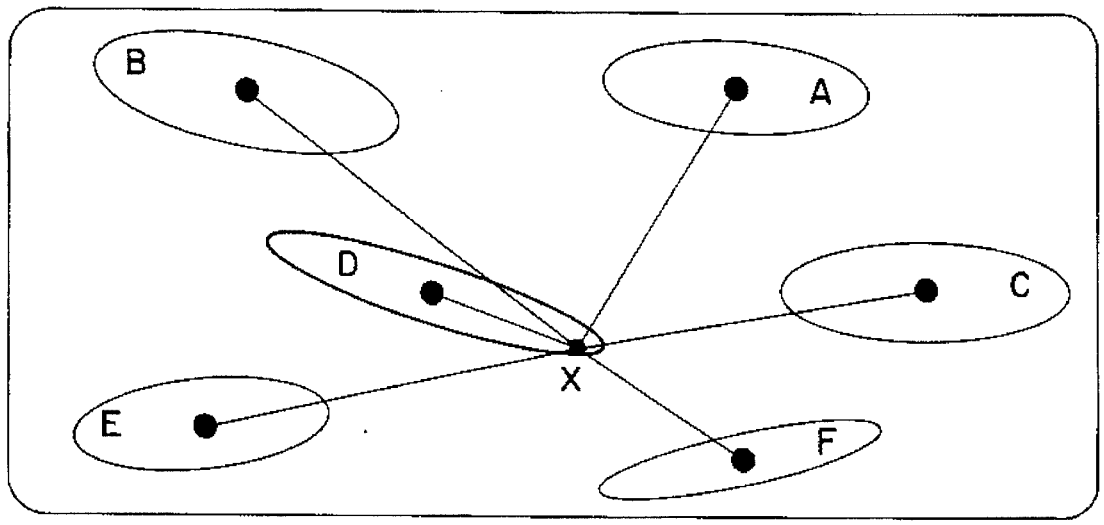
FIG. 6 shows a conventional method for identifying the denominations of bills.

FIG. 4 is the illustration of another modified embodiment of this invention. In this embodiment, two separating hyperplanes are defined for each of all combinations of two denominations selected from the N denominations accepted by the device beforehand. When image data X is in the region between the two separating hyperplanes for two selected denominations, both denominations are discarded from the candidates and stored in the RAM. When image data is in the same region as either one of two selected denominations with respect to the separating hyperplanes, the denomination not in the same region as the image data X is discarded. For example, suppose that denominations A and B are selected and that image data X is in the region between the two separating hyperplanes for A and B, then both A and B are discarded from the candidates and stored in the RAM. These denominations A and B are each combined with the denomination remaining to the last for the test of the similarity to image data X. This method thus can cope with the case when the image data of an unknown bill read by the photo-sensor does not fall within any one of the distribution ranges of the image data of the denominations accepted by the device.

Though this invention is explained above taking a device for identifying the denominations of bills for example, it is apparent that the method of this invention can be applied to other devices for identifying the denominations of pieces of paper such as securities. Further, the method of this invention can also be applied to the audio signal recognition or identification, for example.

Though hyperplanes are used for dividing the euclid space so that the distribution ranges of two selected denominations are completely separated into the different regions, hypercurved surfaces may also be used instead.

This invention has a remarkable effect of improving the accuracy of identification and decreasing the number of steps of the identifying process and thereby shortening the time required, as understood by the above description.

What is claimed:

1. A method of identifying the denominations of pieces of paper comprising the steps of:

obtaining the distribution of image data for each of N denominations to be identified;

defining a separating hyperplane for each of all combinations of two denominations taken from the N denominations which divides a space so that distribution ranges of the image data of the two denominations are completely separated into different regions and storing the data defining the separating hyperplanes as template data in memory means;

selecting two denominations from the N denominations and retrieving the template data corresponding to the combination of denominations from said memory means when the image data of a piece of paper of an unknown denomination is read in with means for reading patterns;

determining which one of the regions divided by said separating hyperplane, said image data of said piece of paper is in;

discarding the denomination in the region in which said image data of the piece of paper is not present;

repeating the same procedures by selecting two denominations from remaining candidate denominations to reduce the number of the candidate denominations until only one denomination is left; and determining that the denomination remaining to the last is the denomination of said piece of paper.

* * * * *